United States Patent
Borgendale et al.

(12) 
(10) Patent No.: US 6,195,710 B1
(45) Date of Patent: Feb. 27, 2001

(54) OPERATING SYSTEM HAVING SHARED PERSONALITY NEUTRAL RESOURCES

(75) Inventors: Kenneth Wayne Borgendale; Ian Michael Holland; Kelvin Roderick Lawrence, all of Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/489,540

(22) Filed: Jun. 12, 1995

(51) Int. Cl.[7] ............................. G06F 9/00; G06F 9/46; G06F 15/163
(52) U.S. Cl. .............................. 709/328; 709/319
(58) Field of Search .................. 395/701, 332, 395/500, 678, 183.22, 733, 406, 683, 682; 345/190; 709/301, 303, 310–332; 710/6

(56) References Cited

U.S. PATENT DOCUMENTS

| | | | |
|---|---|---|---|
| 4,757,441 | * 7/1988 | Buckland et al. | 364/200 |
| 4,937,036 | * 6/1990 | Beard et al. | 340/706 |
| 5,113,180 | * 5/1992 | Gupta et al. | 340/747 |
| 5,218,697 | * 6/1993 | Chung | 395/200.5 |
| 5,228,137 | * 7/1993 | Kleinerman et al. | 395/500 |
| 5,233,611 | * 8/1993 | Triantafyllos et al. | 371/16.1 |
| 5,289,574 | * 2/1994 | Sawyer | 395/157 |
| 5,481,719 | * 1/1996 | Ackermann et al. | 395/700 |
| 5,530,869 | * 6/1996 | Salle | 395/700 |
| 5,553,291 | * 9/1996 | Tanaka et al. | 395/700 |
| 5,566,337 | * 10/1996 | Szymanski et al. | 395/733 |
| 5,668,997 | * 9/1997 | Lynch-Freshner et al. | 709/303 |
| 5,673,403 | * 9/1997 | Brown et al. . | |
| 5,680,551 | * 10/1997 | Martino, II | 395/200.56 |
| 5,715,459 | * 2/1998 | Celi, Jr. et al. | 709/301 |
| 5,715,474 | * 2/1998 | Burke et al. | 710/6 |
| 5,764,984 | * 6/1998 | Loucks | 395/682 |

OTHER PUBLICATIONS

Seltzer, Larry; "Workplace OS details emerge", PC Week, v11, n20, p. 121(2), May 23, 1994.*

Seltzer, Larry, "Workplace OS will change OS/2 development", PC Week, v11, n21, p. 79(1), May 30, 1994.*

Norr, Henry; Apple Aims for Mainstream with Power PC Licensing; MacWeek, v7, n38, p. 1(2); Sep. 27, 1993.*

Cortese, Amy; OS/2 Workplace to Offer Multiple Personalities; PC Week, v10, n10, p. 67(2); Mar. 15, 1993.*

Gingell et al, "Shared Libraries in Sun OS" USENIX 1987 pp. 131–145, Jun. 1987.*

Camp et al, "Microkernels: A Submodule for Tradinal Operating Systems Course" ACM pp. 154–158, Mar. 1995.*

"Windows NT and Workplace OS: Plug it in", Byte Magazine (online) Jan. 1994.*

Varhol, Peter, "Small Kernels Hit It Big", Byte, Jan. 1994.*

Julin et al; "Generalized Emulation Services for Mach 3.0 Overview" USENIX, Nov. 1991.*

* cited by examiner

Primary Examiner—Majid Banankhah
Assistant Examiner—P. G. Caldwell
(74) Attorney, Agent, or Firm—Kelly K. Kordzik; Winstead Sechrest & Minick P.C.; Marilyn S. Dawkins

(57) ABSTRACT

A data processing system having shared, distributed personality neutral resources managed by a microkernel based operating system. The microkernel supports multiple personalities and manages common resources accessible to all personalities. The microkernel has a logical video buffer service that manages the creation, deletion, and maintenance of logical video buffers. Each personality uses the logical video buffers to store its character mode screen displays. The server maintains a handle to each logical video buffer that is accessible by all personalities. The microkernel also has an event window server that creates input queues and provides them to the personalities. The event window server receives all system input and places it into the appropriate personality's queue. The event window server provides APIs allowing personalities to read input queues, remove events from the queues, inject input events into the event window server, and register hot keys.

18 Claims, 3 Drawing Sheets

OPERATING SYSTEM HAVING SHARED PERSONALITY NEUTRAL RESOURCES

TECHNICAL FIELD OF THE INVENTION

This invention pertains in general to data processing systems and more particularly to operating systems and yet more particularly to operating systems having a plurality of operating system personalities.

BACKGROUND OF THE INVENTION

A data processing system is typically controlled by an operating system ("OS"). An OS is software that controls the execution of programs and provides services such as resource allocation, scheduling, input/output control and data management. There are many different types of OSs, including AIX, DOS, and OS/2.

Each type of OS has its own components for directing and managing resources in the data processing system. For example, AIX, DOS, and OS/2 each support character mode applications. Although each OS supports the same character mode features and screen attributes, each OS has a different internal representation of the screen content.

Likewise, each OS has an event queue for accepting input to the data processing system from sources such as a keyboard or mouse. Each OS provides some form of keyboard translation support and varying support for generic input event processing. However, each OS implements its queue and other input invent processing in a different manner.

In prior art data processing systems, the differences between various OSs were not a problem. Each data processing system only used a single OS, and there was no need to reconcile the differences among them.

However, modern data processing systems can simultaneously support multiple OSs. For example, a data processing system using a microkernel based OS can support various OS "personalities." Each personality is a separate full-fledged version of an OS such as AIX, DOS, or OS/2. Thus, multiple OSs can coexist on a single data processing system and the microkernel OS manages their coexistence.

Due to the differences among the OS personalities, a program in one personality has difficulty accessing resources in another. Specifically, a program attempting to read the contents of a character mode window in a different personality must know how to interpret that personality's internal character window structure. For example, IBM's SCREEN READER program assists visually-impaired persons by speaking the contents of a character mode window. SCREEN READER must have separate program components to read the contents of OS/2, DOS, and AIX character windows. Each component must be programmed separately and increases the size and complexity of SCREEN READER.

A similar problem exists with respect to program input. Each input source, such as a mouse, must have a device driver capable of translating its input into each personality's queue. Implementing this capability adds size and complexity to the device driver.

Thus, there is a need in the art for personality neutral resources that can be accessed by each personality in the data processing system.

SUMMARY OF THE INVENTION

It is an object of the present invention to provide personality neutral resources accessible to all personalities operating in a data processing system.

It is another object of the present invention to provide personality neutral logical video buffers that are accessible by all personalities operating in a data processing system.

It is yet another object of the present invention to provide personality neutral input queues that are accessible by all personalities in a data processing system.

These and other objects are met by a data processing system having shared, distributed personality neutral resources managed by a microkernel based operating system. The microkernel supports multiple personalities and manages common resources accessible to all personalities. The microkernel has a logical video buffer service that manages the creation, deletion, and maintenance of logical video buffers. Each personality uses the logical video buffers to store its character mode screen displays. The service maintains a handle to each logical video buffer that is accessible by all personalities.

The microkernel also has an event window server that creates input queues and provides them to the personalities. The event window server receives all system input and places it into the appropriate personality's queue. The event window server provides APIs allowing personalities to read input queues, remove events from the queues, inject input events into the event window server, and register hot keys.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
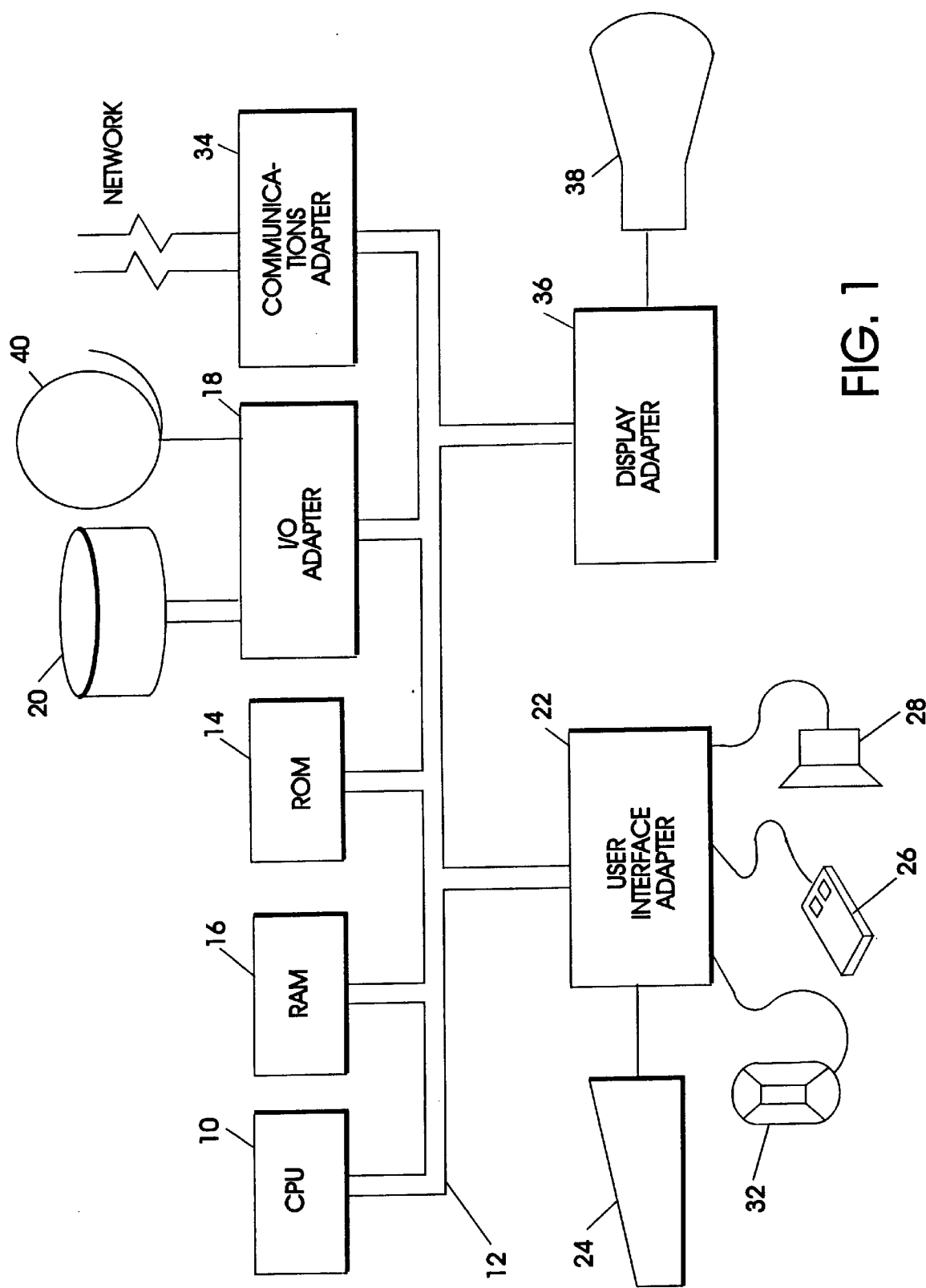
FIG. 1 shows a data processing system embodying the present invention.

A representative hardware environment for practicing the present invention is depicted in FIG. 1, which illustrates a typical hardware configuration of a workstation in accordance with the subject invention having at least one central processing unit 10, such as a conventional microprocessor, and a number of other units interconnected via system bus 12. The workstation shown in FIG. 1 includes random access memory ("RAM") 16, read only memory ("ROM") 14, and input/output ("I/O") adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

Each peripheral device 18–38 has a device driver (not shown on FIG. 1) that enables the peripheral device to communicate with the data processing system. The device drivers are stored in RAM 16, ROM 14, or in hardware associated with their respective peripheral devices.

Figure 2:
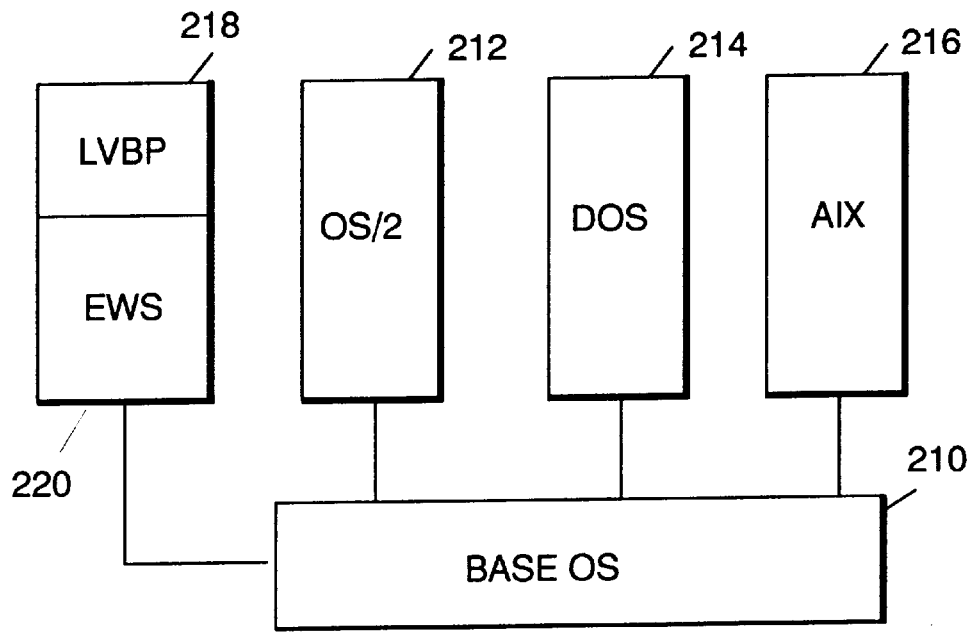
FIG. 2 shows a block diagram of the relevant logical components of an operating system embodying the present invention.

FIG. 2 shows a typical configuration of an operating system ("OS") in accordance with the present invention. A base OS 210, preferably a microkernel OS, resides on disk unit 20 and in RAM 16 while being executed by CPU 10. The base OS 210 controls the low-level aspects of the data processing system. In addition, the base OS 210 simultaneously supports several different OS personalities, such as OS/2 212, DOS 214, and AIX 216. Moreover, each personality runs multiple application programs, or tasks (not shown). Each personality also supports character mode (non-graphical) applications shown in windows on display device 38 and receives input through its own input queue. One personality is the dominant personality. The dominant personality controls the boot process and other tasks involved in managing the OS.

It should be noted that each personality 212–216 has aspects not shown in FIG. 2. OS/2 212, for example, has a graphical user interface ("GUI") called Presentation Manager. OS/2 212 also supports windowed and full screen 38 character mode applications. Similarly, AIX 216 supports a GUI called X Windows and character mode sessions such as xterm and AIXterm. DOS 214, in contrast to OS/2 212 and AIX 216, supports only character mode sessions, although DOS 214 tasks may use graphics.

Figure 3:
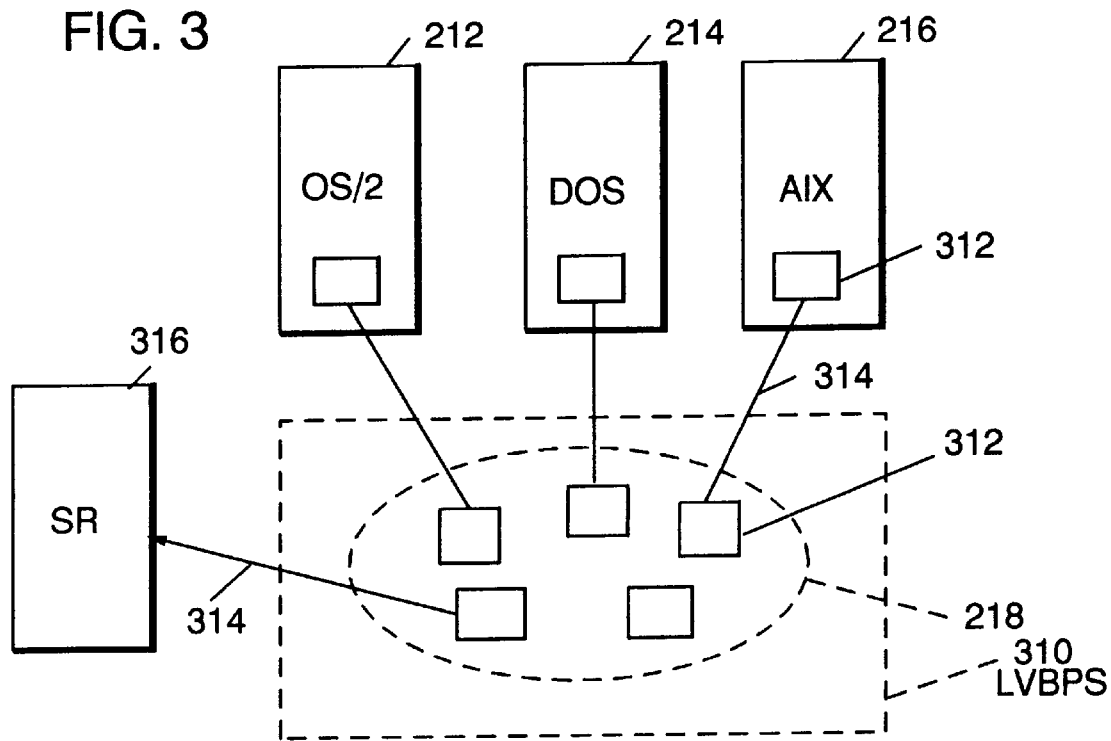
FIG. 3 shows a block diagram of the logical components associated with the logical video buffer pool.

Logical Video Buffer Pool ("LVBP") 218 and Event Window Server ("EWS") 220 are also shown in FIG. 2. These two components 218, 220 are personality neutral ("PN") and are used to simplify communications between base OS 210 and the personalities 212–216 and among the personalities 212–216 themselves. Personalities 212–216 or tasks executing within a personality may request access to a PN resource 218, 220. For purposes of this discussion, any personality, task, or other component accessing a PN resource is called a "client." FIG. 3 shows a detailed view of the logical components associated with LVBP 218. Shown in FIG. 3 are LVBP 218, Logical Video Buffer Pool Service ("LVBPS") 310, OS/2 212, DOS 214, and AIX 216 personalities, and Screen Reader client 316. Although Screen Reader 316 is shown as a discrete component, in reality it is a task running within one of the personalities 212–216.

LVBP 218 is stored in RAM 16. LVBP 218 is comprised of a plurality of Logical Video Buffers ("LVB"). A LVB is a PN architected data structure representing the contents of a character mode window on display device 38. The LVB data structure supports cursor positioning, character attributes, and other LVB state requirements required by clients.

LVBPS 310 is actually a collection of program libraries that manage the creation, deletion and maintenance of LVBs. Accordingly, LVBPS 310 is responsible for maintaining LVBP 218. LVBPS 310 treats each LVB in the pool 218 as a system resource similar, for example, to a data file. In addition, LVBPS 310 maintains a system-wide shared handle to each LVB in the pool 218.

A client requiring a LVB, such as AIX personality 216, requests it from LVBPS 310. LVBPS 310 then grants a LVB 312 to the client 216 by allocating memory for the LVB 312 and mapping it to that client's 216 address space. In the alternative, a client can request a LVB from EWS 220. In that case, EWS 220 utilizes LVBPS 310 and returns a LVB to the client. In either case, the client 216 can then access the LVB 312 using its own character mode Application Programming Interface ("API"). The client 216 may attach the LVB 312 to a graphics subsystem, to a video device interface, to a program that writes the contents to a file, or simply leave it detached.

LVBPS 310 provides an API by which clients can access the handles of granted LVBs. Thus, another client in the data processing system, such as SCREEN READER 316, can use the API to request access to LVB 312. Then, LVBPS 310 provides handle 314 to client 316, thereby allowing client 316 to access the contents of LVB 312. The client 316 is then free to perform actions such as writing the contents of LVB 312 to a file, distributing the contents to another system or task, or sending the contents to a text to speech system.

Figure 4:
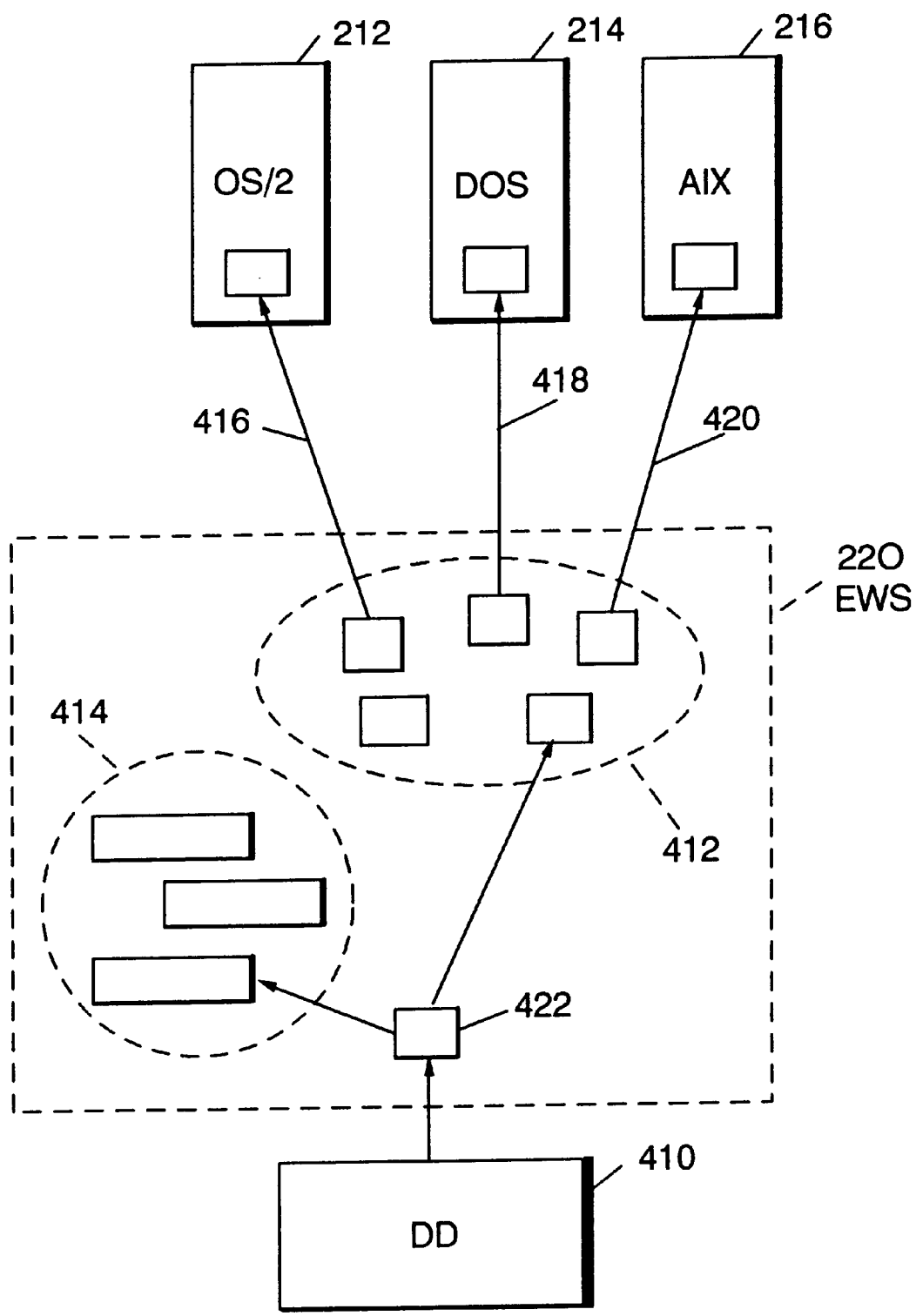
FIG. 4 shows a block diagram of the logical components associated with the event window server.

FIG. 4 shows a detailed view of the logical components associated with EWS 220. Shown are device driver ("DD") 410, input queue pool 412, and event translation and interpretation modules 414. DD 410 represents the numerous peripheral DDs found in a typical data processing system. Also shown are input queues 416–420 of the various personalities 212–216.

EWS 220 is a PN component of OS 210. Similar to LVBPS 218, EWS 220 maintains a pool 412 of input queues and assigns at least one queue to each personality. Each input queue is identified by a system wide shared handle. Queue handles are available to clients through an EWS 220 API.

EWS 220 provides a single point 422 in the data processing system to handle all system input. EWS 220 can receive input events either from a peripheral DD 410 or programmatically from a client using an EWS 220 API. Once an input event has been received, EWS 220 processes the event using its event translation and interpretation modules 414. These modules convert the raw input event into a higher level representation such as a character encoding. Then, EWS 220 packages the event data into a comprehensive event packet that can be understood and processed by a personality. Next, EWS 220 determines into which queue it should place the packet. Normally, the packet will go to the personality having the input focus, as determined by the dominant personality.

The dominant personality or any client can use an EWS 220 API to implement hot keys. The API allows the clients to register hot keys with associated functions. For example, the dominant personality can register the ALT-ESC key combination to cause the input focus to switch to another personality. When EWS 220 receives a hot key as input, it performs the assigned function.

As discussed above, EWS 220 provides several APIs to clients. Clients can programmatically insert events into the system using an EWS 220 API. Clients can also use an EWS 220 API to gain access to a queue handle. Once the client has the handle, it can read and capture events in the queue. Another EWS 220 API allows clients to register hot keys and associated functions.

By using these APIs, clients can access a personality's input queue in a PN manner. For example, an automatic testing program can insert keystrokes into a personality's input queue. Thus, a single version of the testing program can be used to test DOS, OS/2, and AIX programs. Similarly, support for uncommon input devices, such as Special Needs devices and pens can easily be adapted to work with all personalities in the data processing system by providing DDs to input events into EWS 220, rather than a DD for each personality.

Although the present invention and its advantages have been described in detail, it should be understood that various changes, substitutions and alterations can be made herein without departing from the spirit and scope of the invention as defined by the appended claims.

What is claimed is:

1. A data processing system having a plurality of operating system personalities and at least one personality neutral resource comprising:
   a base operating system for controlling the data processing system and the personalities;
   a personality-neutral resource server associated with the base operating system for managing the personality-neutral resource; and
   an application programming interface associated with the resource server for allowing a client executing on the data processing system to access the personality-neutral resource via the application programming interface, wherein the resource server comprises:
      a pool of logical video buffers; and
      a logical video buffer service having a shared reference to each logical video buffer.

2. The data processing system of claim 1, wherein one personality of said plurality of personalities is a dominant personality.

3. The data processing system of claim 1, wherein the base operating system is a microkemel operating system.

4. The data processing system of claim 1, wherein the application programming interface allows the client to access the reference to each logical video buffer.

5. The data processing system of claim 1, wherein a logical video buffer further comprises:
   a set of character attributes that can be accessed by the client via the application programming interface.

6. A data processing system having a plurality of operating system personalities and at least one personality neutral resource comprising:
   a base operating system for controlling the data processing system and the personalities;
   a personality-neutral resource server associated with the base operating system for managing the personality-neutral resource; and
   an application programming interface associated with the resource server for allowing a client executing on the data precessing system to access the personality-neutral resource via the application programming interface, wherein the resource server comprises:
      a pool of input queues, wherein a first queue is associated with a personality; and
      an event windows server for receiving system events and transferring the events into the first input queue.

7. The data processing system of claim 6, wherein the event window server further comprises:
   at least one event translation module for translating the system events into a format understood by the personality.

8. The data processing system of claim 6, wherein the application programming interface further comprises:
   an insertion interface for enabling the client to insert a system event into the event window server; and
   a capture interface for enabling the client to capture system events from the first queue.

9. The data processing system of claim 6, wherein the application programming interface further comprises:
   a hot key interface for allowing the client to register hot keys and associated functions with the event window server.

10. A computer program product having a computer readable medium having computer program logic recorded therein for operating a data processing system having a plurality of operating system personalities and at least one personality neutral resource, said computer program product comprising:
    a base operating system for controlling the data processing system and the personalities;
    a personality-neutral resource server associated with the base operating system for managing the personality-neutral resource; and
    an application programming interface associated with the resource server for allowing a client executing on the data precessing system to access the personality-neutral resource via the application programming interface, wherein the resource server comprises:
       a pool of logical video buffers; and
       a logical video buffer service having a shared reference to each logical video buffer.

11. The computer program product of claim 10, wherein one personality of said plurality of personalities is a dominant personality.

12. The computer program product of claim 10, wherein the base operating system is a microkemel operating system.

13. The computer program product of claim 11, wherein the application programming interface allows the client to access the reference to each logical video buffer.

14. The computer program product of claim 11, wherein a logical video buffer further comprises:
    a set of character attributes that can be accessed by the client via the application programming interface.

15. A computer program product having a computer readable medium having computer program logic recorded therein for operating a data processing system having a plurality of operating system personalities and at least one personality neutral resource said computer program product comprising:
    a base operating system for controlling the data processing system and the personalities;
    a personality-neutral resource server associated with the base operating system for managing the personality-neutral resource; and
    an application programming interface associated with the resource server for allowing a client executing on the data precessing system to access the personality-neutral resource via the application programming interface, wherein the resource server comprises:

a pool of input queues, wherein a first queue is associated with a personality; and an event windows server for receiving system events and transferring the events into the first input queue.

16. The computer program product of claim wherein the event window server further comprises:

at least one event translation module for translating the system events into a format understood by the personality.

17. The computer program product of claim 15, wherein the application programming interface further comprises:

an insertion interface for enabling the client to insert a system event into the event window server; and a capture interface for enabling the client to capture system events from the first queue.

18. The computer program product of claim 15, wherein the application programming interface further comprises:

a hot key interface for allowing the client to register hot keys and associated functions with the event window server.

* * * * *

UNITED STATES PATENT AND TRADEMARK OFFICE
CERTIFICATE OF CORRECTION

PATENT NO. : 6,195,710 B1
DATED : February 27, 2001
INVENTOR(S) : Kenneth Wayne Borgendale; Ian Michael Holland and Kelvin Roderick Lawrence It is certified that error appears in the above-identified patent and that said Letters Patent is hereby corrected as shown below:

Column 5,
Line 35, replace "microkemel" with -- microkernal --.

Column 6,
Line 41, replace "microkemel" with -- microkernal --.

Signed and Sealed this

Thirtieth Day of October, 2001

Attest:

NICHOLAS P. GODICI
Attesting Officer     Acting Director of the United States Patent and Trademark Office